United States Patent
Shin et al.

(10) Patent No.: US 9,798,761 B2
(45) Date of Patent: Oct. 24, 2017

(54) APPARATUS AND METHOD FOR FSYNC SYSTEM CALL PROCESSING USING ORDERED MODE JOURNALING WITH FILE UNIT

(71) Applicant: RESEARCH & BUSINESS FOUNDATION SUNGKYUNKWAN UNIVERSITY, Suwon-si (KR)

(72) Inventors: Dong Kun Shin, Seoul (KR); Dae Jun Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 342 days.

(21) Appl. No.: 14/805,993

(22) Filed: Jul. 22, 2015

(65) Prior Publication Data
US 2016/0026674 A1 Jan. 28, 2016

(30) Foreign Application Priority Data
Jul. 24, 2014 (KR) .................. 10-2014-0093725

(51) Int. Cl.
*G06F 7/04* (2006.01)
*G06F 17/30* (2006.01)

(52) U.S. Cl.
CPC .. *G06F 17/30371* (2013.01); *G06F 17/30174* (2013.01); *G06F 17/30191* (2013.01); *G06F 17/30227* (2013.01); *G06F 17/30368* (2013.01)

(58) Field of Classification Search
CPC ......... G06F 17/30174; G06F 17/30227; G06F 17/30191; G06F 17/30368; G06F 17/30371; G06F 17/30377; G06F 17/30165
See application file for complete search history.

(56) References Cited

U.S. PATENT DOCUMENTS

| 8,290,994 B2 * | 10/2012 | Allalouf ............... G06F 3/0604 707/821 |
| 2012/0137299 A1 * | 5/2012 | Moyer .................. G06F 3/0613 718/102 |

(Continued)

FOREIGN PATENT DOCUMENTS

| KR | 10-0453228 B1 | 10/2004 |
| KR | 10-2005-0052016 A | 6/2005 |

OTHER PUBLICATIONS

Shen et al, "Journaling of Journal is (Almost) Free," FAST '14, Usenix Conference of File and Storage Technolofies, Feb. 17-20, 2014.*

(Continued)

*Primary Examiner* — Bruce Moser
(74) *Attorney, Agent, or Firm* — NSIP Law

(57) ABSTRACT

A computing device supporting ordered mode journaling. The computing device includes a memory that stores a program for operating a file system supporting ordered mode journaling; and a processor that operates the program stored in the memory. Wherein during execution of the program, when ordered mode journaling for a transaction including one or more files is implemented, the processor stores the transaction in a data area of the memory, and implements the journaling by storing a common journal including metadata of the transaction in a journal area of the memory.

11 Claims, 8 Drawing Sheets

(56) References Cited

U.S. PATENT DOCUMENTS

2015/0356112 A1* 12/2015 Lee .................. G06F 17/30174
707/625
2015/0379036 A1* 12/2015 Shin .................. G06F 17/30191
707/624

OTHER PUBLICATIONS

Park et al, "iJournaling: Fine-Grained Journaling for Improving the Latency of Fsync System Call," 2017 Usenix Annual Technical Conference, Jul. 12-14, 2017.*

* cited by examiner

APPARATUS AND METHOD FOR FSYNC SYSTEM CALL PROCESSING USING ORDERED MODE JOURNALING WITH FILE UNIT

CROSS-REFERENCE TO RELATED APPLICATION

This application claims the benefit of Korean Patent Application No. 10-2014-0093725 filed on Jul. 24, 2014, the disclosures of which are incorporated herein by reference.

TECHNICAL FIELD

The embodiments described herein pertain generally to a method and an apparatus for fsync system call processing using ordered mode journaling with a file unit.

BACKGROUND

A file system included in an operating system accesses a storage device of a computing device like a desktop computer, a notebook computer, a smartphone, a tablet PC or others to implement reading, writing and managing a file.

A file system, which has been widely used in recent years, is an extended file system 4 (EXT4). EXT4 is an improved version of the extended file system 3 (EXT3) and provides journaling guaranteeing consistency and continuity. In this case, the journaling is a technique that can restore a file system fast when the system is suddenly terminated due to occurrence of a system failure, a power error or other problems in the computing device. In EXT4, the journaling periodically records a journal log of a storage device in a pre-reserved area of the storage device, i.e., a journal area.

The journaling of EXT4 supports a write-back mode, an ordered mode, and a data mode. The ordered mode journaling is a basic option of the journaling of EXT4. In order to maintain consistency of the file system, the ordered mode journaling records only metadata in the journal area after all data that need to be updated are recorded.

In general, the ordered mode journaling of EXT4 uses a journal thread executed in a background. Thus, the ordered mode journaling has no significant problem even when there is a large volume of data to be stored, and a file having a long response time is stored. However, unlike the conventional ordered mode journaling, an fsync system call does not use the journal thread, and thus, storing a file is not implemented in a background. Therefore, the response time of the journaling may be critical upon the fsync system call.

The fsync system call is one of system call functions of Linux, which is used to be guaranteed as to whether changes in a file designated by a user have been surely recorded in the storage device. In EXT4, the fsync system call records one or more corrected data and their metadata within a transaction in a data area and a journal area of a memory by using the journaling thread. In this case, the transaction is a collection of updates of a file system. That is, the transaction may include corrected data of a file and metadata thereof generated by file calculation after the latest change in a file system. Thus, the transaction may include a file, which is not included in the fsync system call. If there are significant changes in a file, which has not been requested in the fsync system call, the time for implementing the fsync system call may increase.

Below are conventional disclosures to solve the foregoing problems.

Korean Patent Application Publication No. 10-2005-0052016 (entitled: "Method of and Apparatus for Logging and Restoring the Metadata in File System") describes changing metadata in a transaction unit, and storing logs of the changed metadata in a global log buffer unit. This disclosure identifies whether there has been any change in the metadata stacked in the buffer by using the metadata logs, and stores the change, if any, in a disk.

In addition, Korean Patent Publication No. 10-0453228 (entitled: "Journaling and Recovery Method for Shared Disk File System") describes identifying whether any change has been made in metadata stacked in a buffer and storing the change, if any, in a storage device.

SUMMARY

In order to solve the foregoing conventional technical problems, an example embodiment provides a method and an apparatus for reducing implementation time upon an fsync system call by using ordered mode journaling with a file unit.

However, the problems sought to be solved by the present disclosure are not limited to the above description, and other problems can be clearly understood by those skilled in the art from the following description.

In accordance with a first exemplary embodiment, there is provided a computing device supporting ordered mode journaling. The computing device includes a memory that stores a program for operating a file system supporting ordered mode journaling; and a processor that operates the program stored in the memory. During execution of the program, when ordered mode journaling for a transaction including one or more files is implemented, the processor stores the transaction in a data area of the memory, and implements the journaling by storing a common journal including metadata of the transaction in a journal area of the memory. And when an fsync system call for any one file included in the transaction occurs, the processor stores the file, for which the fsync system call has occurred, in the data area of the memory, and implements the journaling by storing an fsync journal including metadata of the file, for which the fsync system call has occurred, in the journal area of the memory.

In accordance with a second exemplary embodiment, there is provided a method for ordered mode journaling of a file system. The method included implementing ordered mode journaling for a transaction including one or more files; storing the transaction in a data area of a memory; and implementing the journaling by storing a common journal including metadata of the transaction in a journal area of the memory. When an fsync system call for any one file included in the transaction occurs, journaling with a unit of the file, for which the fsync system call has occurred, is implemented in response to the fsync system call.

In accordance with a third exemplary embodiment, there is provided a method for restoring a file system based on ordered mode journaling. The method included identifying a type of a journal finally stored in a journal area of a memory; restoring the file system by using metadata of a common journal if the type of the journal is the common journal; and restoring the file system by using metadata of an fsync journal if the type of the journal is an fsync journal.

In accordance with one of the foregoing technical means, an example embodiment can provide a method and an apparatus for fsync system call processing using ordered model journaling with a file unit, and as a result, various ripple effects in relevant business areas can be expected.

Since an example embodiment implements ordered mode journaling with a file unit upon implementing an fsync system call, it can reduce time required for the fsync system call, compared to conventional ordered mode journaling with a transaction unit. Further, upon restoring a file system, an example embodiment implements the restoration by using an fsync journal only when ordered mode journaling has not been implemented after the fsync system call, and thus, consistency of the file system can be maintained. Therefore, performance deterioration of a database and an application, which often use the fsync system call, can be suppressed.

DETAILED DESCRIPTION

Figure 1A:
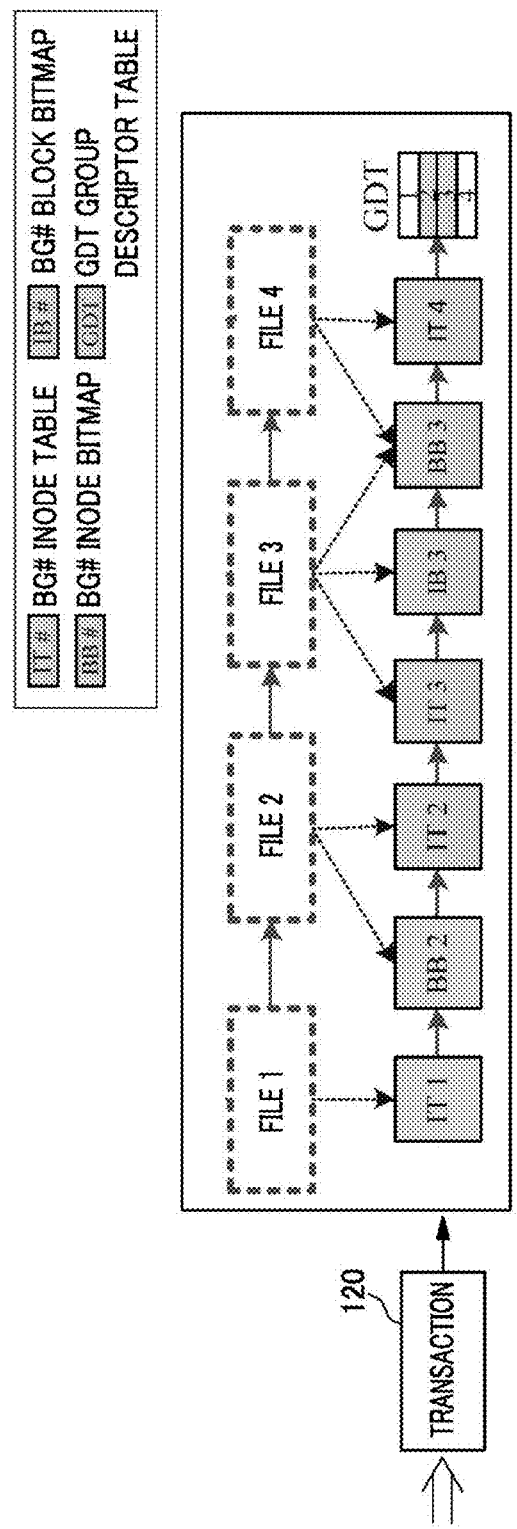
FIG. 1A and FIG. 1B are illustrative diagrams for depicting an fsync system call processing process using ordered mode journaling in conventional EXT4.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operation and/or existence or addition of elements are not excluded in addition to the described components, steps, operation and/or elements unless context dictates otherwise.

A file system means a system, which stores and manages files or data in a storage device, a database and others connected to a computing device. For example, the file system may include a file allocation table 32 (FAT32), a new technology file system (NTFS), EXT3, EXT4, etc.

Figure 1B:
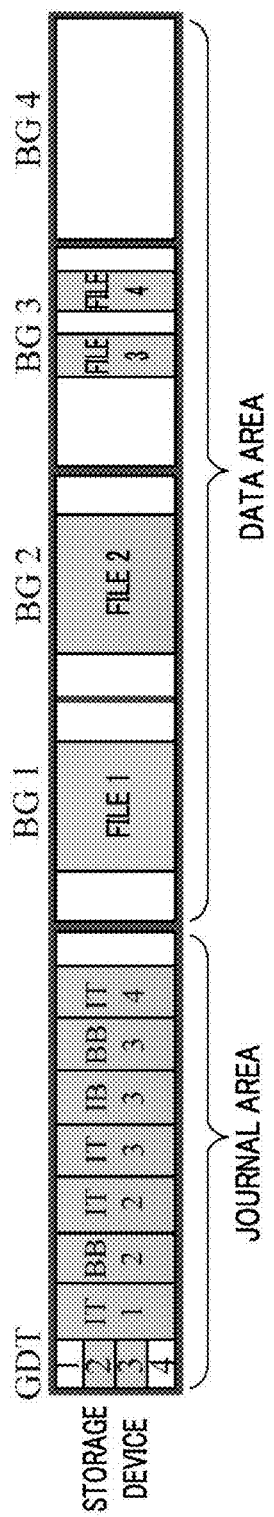

Next, an fsync system call processing process using ordered mode journaling in conventional EXT4 is described by using FIG. 1A and FIG. 1B.

A file system, which has been widely used in recent years, is EXT 4. EXT4 is a file system, which is mostly used in an operating system like Android, Linux or others, and provides journaling guaranteeing consistency and continuity.

In this case, the journaling is a technique that periodically records changes of a file system in a storage device to rapidly restore the file system when the system is suddenly terminated due to a system failure, a power error, or the like. Journaling supported in EXT4 includes write-back mode journaling, ordered mode journaling, and data mode journaling. Here, the ordered mode journaling is the representative journaling used in EXT4.

In order to maintain consistency of a file system, the ordered mode journaling records one or more data that are included in a transaction and need to be updated in a data area of a storage device, and then, records metadata thereof in a journal area of the storage device. In this case, since the conventional general ordered mode journaling is implemented in a background, there is no significant problem even though the data include data requiring long time to be stored in the transaction. However, unlike the conventional general ordered mode journaling, in case of using an fsync system call, which is not implemented in a background, response time of journaling is critical.

FIG. 1A and FIG. 1B are illustrative diagrams for depicting an fsync system call processing process using ordered mode journaling in conventional EXT4.

Referring to FIG. 1A, the transaction includes four files, of which data have been corrected, but have not yet been stored in the storage device, and their related eight metadata. In this case, the metadata may include inode tables, block bitmap, inode bitmap, a group descriptor table(GDT) and others with regard to the corrected files. The inode tables is metadata that record information of files. And the block bitmap is metadata that record allocation of files. Also, the block bitmap is metadata that record allocation of data blocks within a block group.

Referring to FIG. 1B, the storage device includes one journal area and one data area. For example, the data area may consist of four block groups indicated as "BG1," "BG2," "BG3" and "BG4."

When an fsync system call for "File 3" occurs, the conventional general ordered mode journaling calls a journaling thread to implement journaling for the transaction. In this case, the fsync system call is used for files, which is frequently updated and should be assured to be stored in the storage device at a certain time, like an XML setting file of data or applications to be stored in a database management system (DBMS).

In this case, the fsync system call is not implemented in a background. Thus, when an fsync system call occurs, the conventional general ordered mode journaling waits until corrected data of all the files present in the transaction are stored in the data area. That is, in FIG. 1A, when an fsync system call occurs, the conventional general ordered mode journaling waits by the time that all corrected data of "File 1," "File 2," and "File 4," to which corrections have been made, in addition to target "File 3," are stored in the data area of the storage device of FIG. 1B. After the corrected data of all the files are written in the data area, the conventional general ordered mode journaling records the metadata present in the transaction in the journal area.

Since the conventional general ordered mode journaling waits until even the files irrelative to "File 3" are stored in the data area, the response time of the fsync system call increases. Especially, if the files having no relationship to "File 3" are large in size, the response time of the fsync system call may further increase.

In order to solve the problem, the ordered mode journaling with a file unit has been suggested. The ordered mode journaling with a file unit separates a file implementing an fsync system call from the transaction to implement the ordered mode journaling in a file unit. The ordered mode journaling with a file unit may reduce the time required for an fsync system call, compared to the conventional general ordered mode journaling. However, in the ordered mode journaling with a file unit, the metadata of the transaction also reflect results of changes by file calculation of another file, which is not the corresponding file, due to the characteristics of the metadata. Thus, the ordered mode journaling with a file unit may result in the inconsistency state.

An example embodiment provides an apparatus and a method for ordered mode journaling with a file unit, which solve the problems of the conventional ordered mode journaling and the conventional ordered mode journaling with a file unit, and are capable of reducing response time of an fsync system call while maintaining consistency of a file system, upon implementing the fsync system call.

Figure 2:
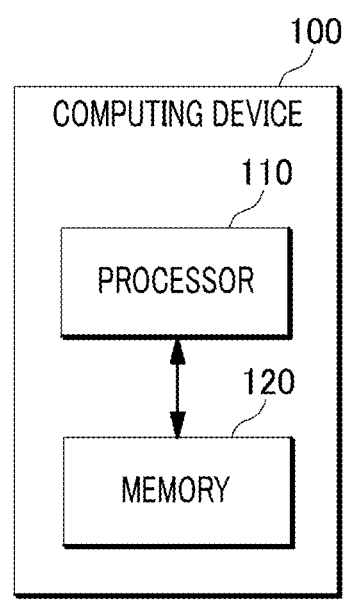
FIG. 2 is a structure diagram illustrating a computing device in accordance with an example embodiment.
Figure 3:
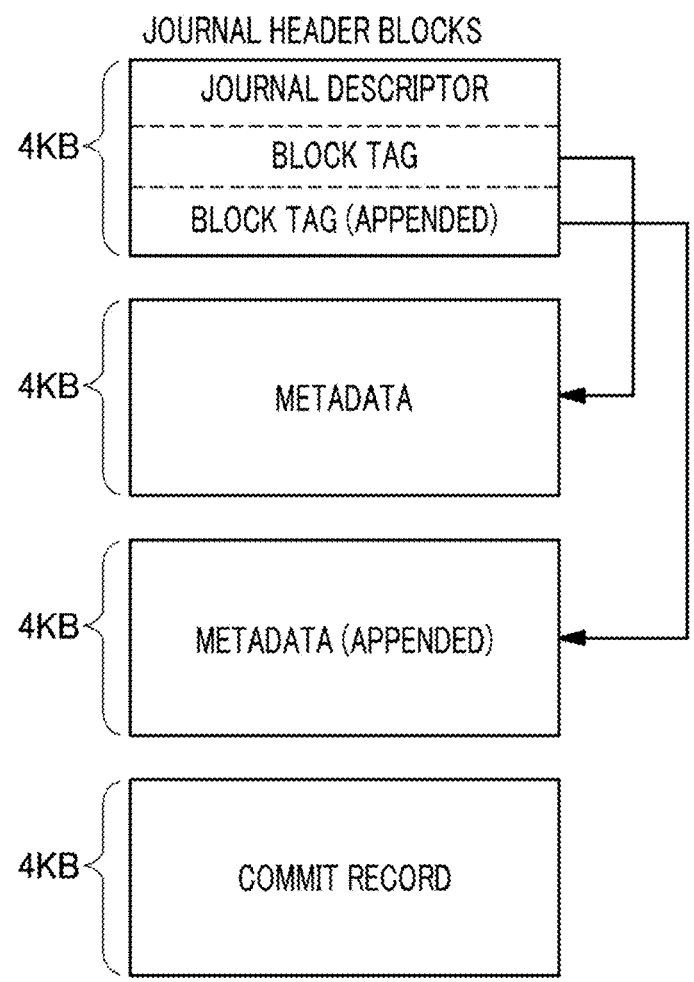
FIG. 3 is a structure diagram illustrating a common journal in accordance with an example embodiment.
Figure 4:
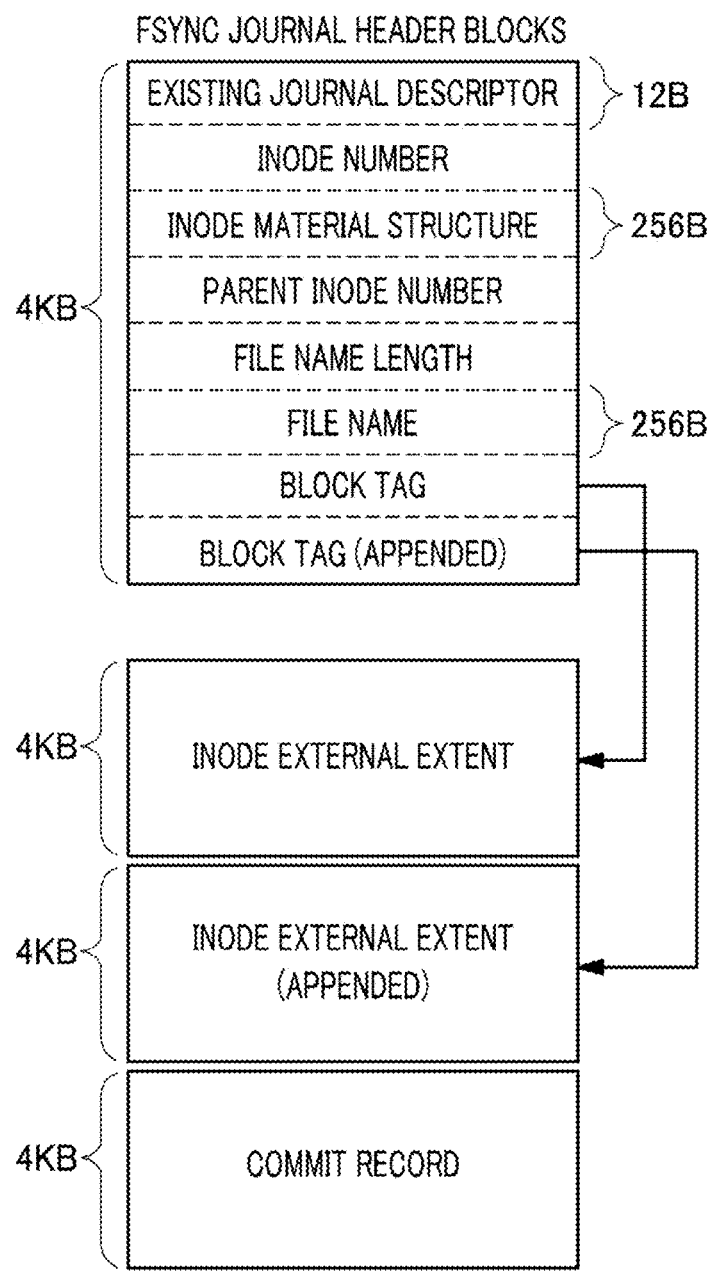
FIG. 4 is a structure diagram illustrating an fsync journal in accordance with an example embodiment.

Next, a computer device supporting ordered mode journaling with a file unit in accordance with an example embodiment is described referring to FIG. 2 to FIG. 4.

FIG. 2 is a structure diagram illustrating a computing device in accordance with an example embodiment.

A computing device 100 in accordance with an example embodiment may include a memory 120 that is a storage device equipped with a program for operating a file system supporting ordered mode journaling with a file unit, and a processor 110 that operates the program stored in the memory 120.

The computing device 100 may include a server, a workstation, general computers such as a desktop computer and a notebook computer, latest smart devices such as a smartphone and a tablet PC, and so on.

The memory 120 of the computing device 100 generally refers to a storage device that continuously keeps stored information even when no power is supplied. For example, the memory 120 may include a NAND flash memory such as a compact flash (CF), a secure digital (CD) card, a memory stick, a solid-state drive (SSD), and a micro SD card, or a magnetic computer storage device such as a hard disk drive (HDD).

The program stored in the memory 120 may operate as an operating system that operates a file system, to which an example embodiment is applied, or be configured in a form of an application equipped with a file system, to which an example embodiment is applied.

In addition, the memory 120 may include a data area and a journal area like the memory supporting the conventional ordered mode journaling. In an example embodiment, the journal area may store a common journal or an fsync journal. In addition, the data area may store data.

During execution of the program, when ordered mode journaling for a transaction including one or more files is implemented, the processor 110 may store the transaction in the data area of the memory 120, and implement the journaling by storing a common journal including metadata of the transaction in the journal area of the memory 120.

In addition, during execution of the program, when an fsync system call for one file included in the transaction occurs, the processor 110 may store the file in the data area of the memory 120, and implement the journaling by storing an fsync journal including metadata of the fsync file in the journal area of the memory 120.

That is, the ordered mode journaling in accordance with an example embodiment may be similar to the conventional ordered mode journaling. Thus, upon implementing ordered mode journaling for a transaction, the processor 110 may implement the journaling for one or more files belonging to the transaction. However, since the journaling in the fsync system call in accordance with an example embodiment is implemented only for the corresponding file, it is different from the conventional ordered mode journaling in light of this point. When the fsync system call occurs, the processor 110 implements journaling only for the corresponding file, and as a result, there is an advantage in that required time is reduced, compared to the conventional ordered mode journaling. The general ordered mode journaling and the ordered mode journaling in accordance with an example embodiment are described for comparison with reference to FIG. 3 and FIG. 4.

FIG. 3 is a structure diagram illustrating a common journal in accordance with an example embodiment. FIG. 4 is a structure diagram illustrating an fsync journal in accordance with an example embodiment.

The common journal may be structured as shown in FIG. 3, and the fsync journal may be structured as shown in FIG. 4. As illustrated in FIG. 3, the common journal may include a journal descriptor, a block tag, metadata and a commit record. Unlike the common journal, the fsync journal of FIG. 4 may include inode information, file information and others together with a journal descriptor. The inode information to be stored in the fsync journal may be an inode number, an inode material structure and others. The inode information may be used to restore inode of the corresponding file. Thus, upon restoring the file system, the processor 110 may implement the restoration in the manner of recording an inode material structure corresponding to existing inode tables.

The common journal and the fsync journal may be stored in the journal area of the memory 120 by using an appending method. Thus, a journal that the processor 110 finally stores in the journal area may be a common journal or an fsync journal, for which journaling has been most recently implemented.

In addition, the fsync journal in accordance with an example embodiment may include fsync journal header blocks. The fsync journal header blocks is the same as the fsync journal header blocks of FIG. 4, and may include a journal descriptor, an inode number and an inode material structure, which are inode information, a parent inode number, a file name length and a file name, which are file information, and others. Thus, during execution of the program, the processor 110 may record inode information and name information of a file in the fsync journal header blocks.

In FIG. 4, the parent inode number, the file name length, the file name, etc., of the fsync journal header blocks of the fsync journal are information for restoring a name of the corresponding file. The processor 110 may find the parent inode in the existing inode tables, to implement the restoration in the manner of renewing the corresponding file name in a directory entry.

In addition, in order to restore the file system, the processor 110 may analyze a type of a journal finally appended to the journal area of the memory 120. If the type of the finally appended journal is a common journal, the processor 110 may restore the file system by using metadata of the common journal. To the contrary, if the type of the finally appended journal is an fsync journal, the processor 110 may restore the file system by using metadata of the fsync journal.

Since the processor 110 implements journaling in a file unit when the fsync system call is implemented, the fsync journal may not have information about a file, which belongs to an identical transaction to the transaction of the file as the target of the fsync system call and shares the metadata of the transaction. Thus, in the case where the processor 110 has implemented the ordered mode journaling after the implementation of the fsync system call, if the restoration is implemented by using the fsync journal, the file system may be in the inconsistency state.

However, as described above, since recording in the journal area is implemented in the appending manner, a journal finally appended to the journal area may be the journal, for which journaling has been most recently implemented. Thus, the processor 110 may analyze a type of the finally appended journal and implement the restoration depending on the type of the journaling that has been most recently implemented, so as to maintain the consistency of the file system.

That is, if a journal finally stored in the journal area is the fsync journal, the ordered mode journaling has not been implemented after the fsync system call, and thus, the processor 110 may implement the restoration of the file system by using the fsync journal. If the finally stored journal is the common journal, the ordered mode journaling has been implemented after the fsync system call, and thus, the processor 110 may restore the file system by using the same method as the common restoration process.

In this case, if the type of the journal is the fsync journal, the processor 110 may correct the metadata stored in the memory 120 by using the metadata recorded in the fsync journal, after the restoration of the file system. Since the metadata stored in the memory 120 are corrected after the restoration of the file using the fsync journal, the processor 110 can maintain the consistency of the file system.

Meanwhile, since the processor 110 in accordance with an example embodiment implements the ordered mode journaling with a file unit upon the implementation of the fsync system call, it can reduce the required time, compared to the conventional ordered mode journaling with a transaction unit. In addition, upon restoring the file system, the processor 110 may implement the restoration by using the fsync journal only when the ordered mode journaling has not been implemented after the fsync system call. Thus, the processor 110 may correct the metadata stored in the memory 120 after the implementation of the restoration of the file system using the fsync journal, so as to maintain the consistency of the file system.

Figure 5:
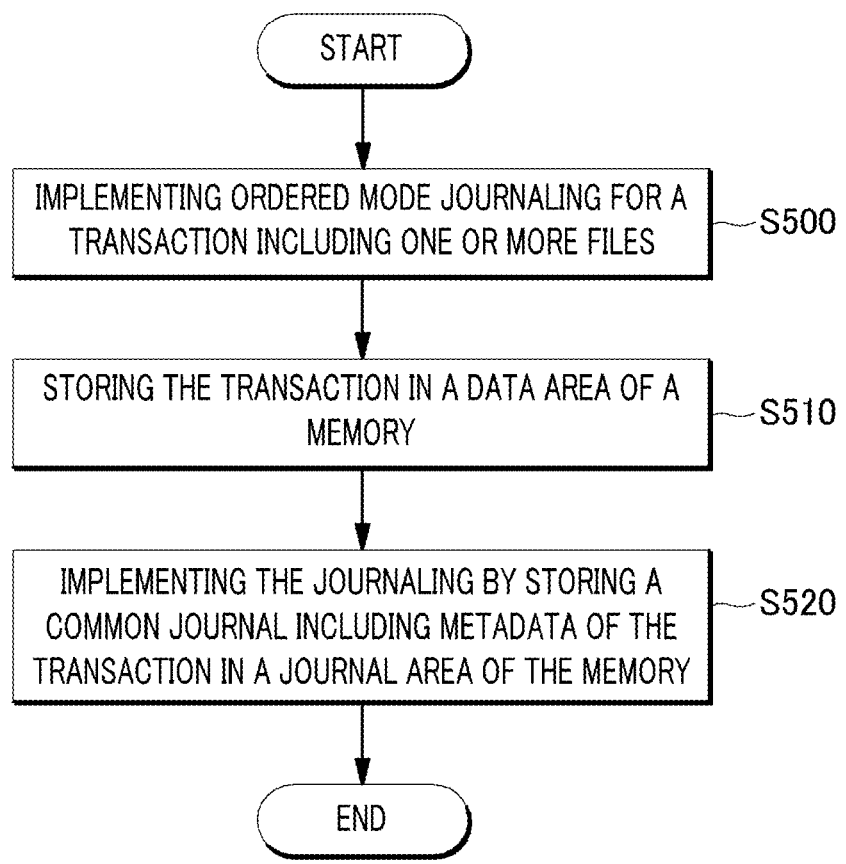
FIG. 5 is a flow chart of ordered mode journaling in accordance with an example embodiment.
Figure 6:
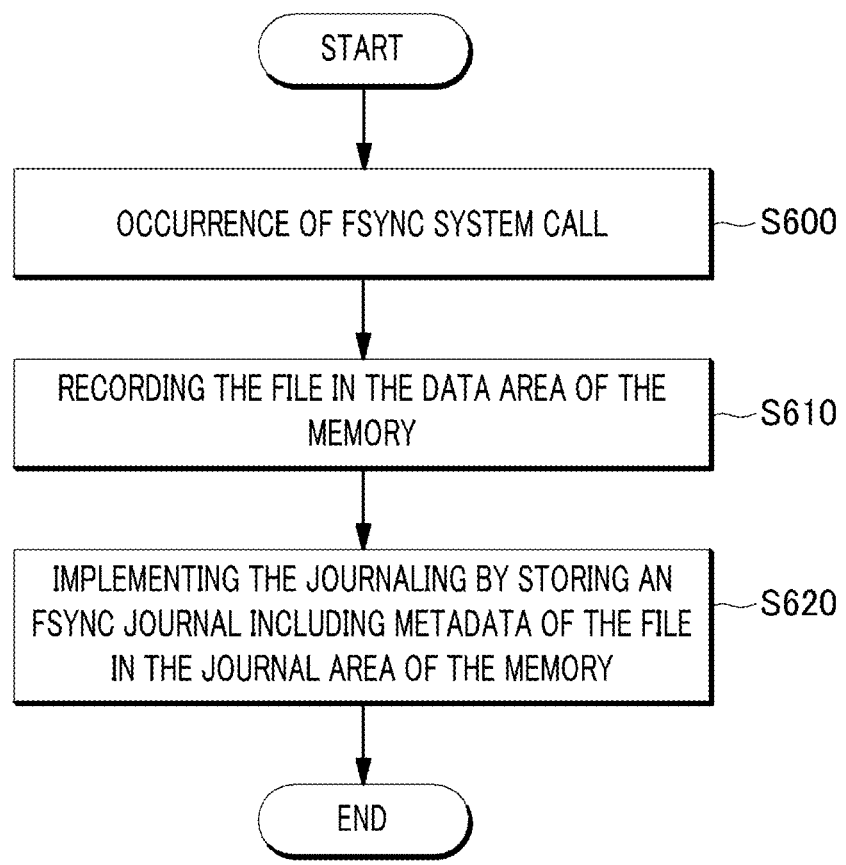
FIG. 6 is a flow chart of a method for fsync system call processing using ordered mode journaling in accordance with an example embodiment.

Next, the ordered mode journaling with a file unit in accordance with an example embodiment is described by using FIG. 5 and FIG. 6.

FIG. 5 is a flow chart of ordered mode journaling in accordance with an example embodiment. FIG. 6 is a flow chart of an fsync system call processing method using ordered mode journaling in accordance with an example embodiment.

The computing device 100 in accordance with an example embodiment may implement ordered mode journaling for a transaction including one or more files (S600). Once the ordered mode journaling is implemented, the computing device 100 may first store the transaction in the data area of the memory 120 (S610). The computing device 100 may implement the journaling by storing the common journal including metadata of the transaction in the journal area of the memory 120 (S620). In this case, when an fsync system call occurs, the computing device 100 may implement the journaling in a file unit in response to the fsync system call.

The computing device 100 may implement the journaling in the same manner as the conventional ordered mode journaling. That is, when the ordered mode journaling for the transaction is implemented, the computing device 100 may implement the journaling for one or more files included in the transaction.

However, the computing device 100 may implement the fsync system call of the file system in a different manner from the conventional ordered mode journaling. In order to implement the journaling with a fine unit in response to the fsync system call of the file system, when the fsync system call occurs (S700), the computing device 100 may record the corresponding file in the data area of the memory 120 (S710). The computing device 100 may implement the journaling by storing the fsync journal including metadata of the file in the journal area of the memory 120 (S720). Since the computing device 100 implements journaling only for the file, which is the target for the fsync system call, among one or more files included in the transaction, it is advantageous in that required time is reduced upon implementation of the fsync system call, compared to the conventional ordered mode journaling.

In this case, the fsync journal may include fsync journal header blocks. Thus, in order to implement journaling by storing the fsync journal including metadata of the file, which is the target of the fsync system call, in the journal area of the memory 120, the computing device 100 may record inode information and name information of the corresponding file in the fsync journal header blocks.

As described above, the common journal and the fsync journal are structured as shown in FIG. 3 and FIG. 4, respectively. That is, as shown in FIG. 3, the common journal may include a journal descriptor, a block tag, metadata and a commit record. Unlike the common journal, the fsync journal of FIG. 4 may include inode information, file information and others together with a journal descriptor. The inode information stored in the fsync journal may be an inode number, an inode material structure and others. The inode information may be used to restore inode of the corresponding file. Upon restoring the file system, the restoration may be implemented in the manner of recording an inode material structure corresponding to existing inode tables.

In addition, the fsync journal may include fsync journal header blocks. As described above, the fsync journal header blocks is the same as the fsync journal header blocks of FIG. 4, and may include a journal descriptor, an inode number and an inode material structure, which are inode information, a parent inode number, a file name length and a file name, which are file information, and others. Information such as the parent inode number, the file name and file name length may be used to restore the name of the corresponding file upon restoring the file.

The computing device 100 may use the appending method for the common journal and the fsync journal included in the journal area of the memory 120. Thus, the computing device 100 may finally record the common journal or the fsync journal, for which journaling has been most recently implemented, in the journal area of the memory 120.

Figure 7:
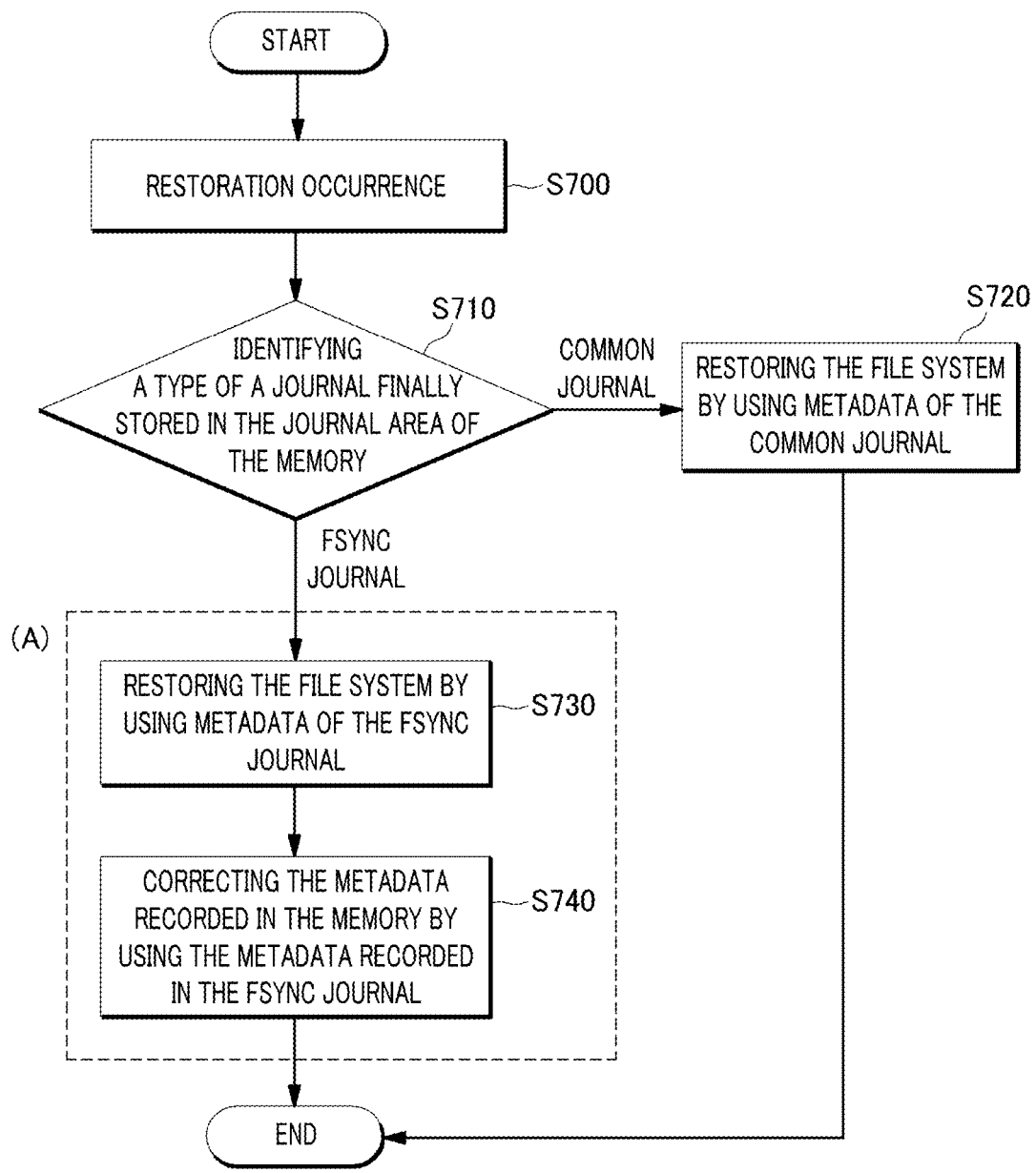
FIG. 7 is a flow chart of a method for restoring a file system using ordered mode journaling in accordance with an example embodiment.

Next, a restoration method using the ordered mode journaling with a file unit in accordance with an example embodiment is described by using FIG. 7.

FIG. 7 is a flow chart of a file system restoring method using ordered mode journaling in accordance with an example embodiment.

For the file system restoration based on the ordered mode journaling, when the restoration of the file system is implemented (S800), the computing device 100 may identity a type of a journal, which has been finally stored in the journal area of the memory 120 (S810). If the type of the journal finally stored in the memory 120 is the common journal, the computing device 100 may restore the file system by using metadata of the common journal (S820). However, if the type of the journal finally stored in the memory 120 is the fsync journal, the computing device 100 may restore the file system by using metadata of the fsync journal (S830).

When fsync system call is implemented, the computing device 100 implements journaling in a file unit, and as such, the fsync journal stored in the journal area of the memory 120 may not include information about a file, which belongs to the same transaction as that of the file of the fsync system call and share the metadata thereof. Thus, in the case where the ordered mode journaling has been implemented after the implementation of the fsync system call, if the computing device 100 implements the restoration by using the fsync journal, the file system may be in the inconsistency state.

However, since the journal area of the memory 120 stores the common journal and the fsync journal by using the appending method, the common journal or the fsync journal, for which journaling has been most recently implemented, may be finally recorded in the journal area of the memory 120. That is, if the computing device 100 analyzes a type of the journal finally stored in the journal area, it can identify a type of the journaling that has been most recently implemented. Thus, the computing device 100 may analyze a type of a journal finally stored in the journal area of the memory 120 prior to the implementation of the restoration. Also, the computing device 100 may implement the restoration by using the fsync journal only when the ordered mode journaling has not been implemented after the fsync system call. Through this process, the computing device 100 may maintain the consistency of the file system.

In addition, in order to maintain the consistency of the file system, the computing device 100 may correct the metadata recorded in the memory 120 by using the metadata recorded in the fsync journal after restoring the file system by using the metadata of the fsync journal (S840).

Upon restoring the file system by using the file system restoring method, the computing device 100 may implement the restoration by using the fsync journal only when the ordered mode journaling has not been implemented after the fsync system call. Also, the computing device 100 may correct the metadata stored in the memory 120 after the restoration of the file system using the fsync journal is implemented, so as to maintain the consistency of the file system.

The apparatus 100 and the method for fsync system call processing using the ordered mode journaling with a file unit in accordance with an example embodiment can provide an fsync system call processing method and apparatus using ordered mode journaling with a file unit.

Accordingly, since the apparatus 100 and the method for fsync system call processing implement the ordered mode journaling with a file unit upon implementation of an fsync system call, they can reduce time required for the fsync system call, compared to the ordered mode journaling with a transaction unit. In addition, since the apparatus 100 and the method for fsync system call processing implement the restoration by using the fsync journal only when the ordered mode journaling has not been ordered after the fsync system call, the consistency of the file system can be maintained. Thus, the apparatus 100 and the method for fsync system call processing can suppress performance deterioration of a database, an application and others, which often use the fsync system call.

The example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the example embodiments have been described in relation to the certain examples. However, the components or parts or all the operations of the method and the system may be embodied using a computer system having universally used hardware architecture.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A computing device supporting ordered mode journaling, comprising:
    a memory that stores a program for operating a file system supporting ordered mode journaling; and
    a processor that operates the program stored in the memory,
    wherein during execution of the program, when ordered mode journaling for a transaction including one or more files is implemented, the processor stores the transaction in a data area of the memory, and implements the ordered mode journaling by storing a common journal including metadata of the transaction in a journal area of the memory, and
    when an fsync system call for any one file included in the transaction occurs, the processor stores the file, for which the fsync system call has occurred, in the data area of the memory, and implements the journaling by storing an fsync journal including metadata of the file, for which the fsync system call has occurred, in the journal area of the memory.

2. The computing device of claim 1,
wherein the processor stores the common journal and the fsync journal using an appending manner in the journal area of the memory.

3. The computing device of claim 1,
wherein the fsync journal comprises fsync journal header blocks,
the processor records inode information and name information of the file, for which the fsync system call has occurred, in the fsync journal header blocks.

4. The computing device of claim 1,
wherein the processor analyzes a type of a journal finally appended to the journal area in order to restore the file system,
if the type of the journal is the common journal, the processor restores the file system by using metadata of the common journal, and
if the type of the journal is the fsync journal, the processor restores the file system by using metadata of the fsync journal.

5. The computing device of claim 4,
wherein if the type of the journal is the fsync journal, the processor corrects the metadata recorded in the memory by using the metadata recorded in the fsync journal, after the restoration of the file system.

6. A method for ordered mode journaling of a file system, comprising:
implementing ordered mode journaling for a transaction including one or more files;
storing the transaction in a data area of a memory; and
implementing the ordered mode journaling by storing a common journal including metadata of the transaction in a journal area of the memory,
wherein when an fsync system call for any one file included in the transaction occurs, journaling with a unit of the file, for which the fsync system call has occurred, is implemented in response to the fsync system call.

7. The ordered mode journaling method of claim 6,
wherein the journaling with the unit of the file comprises:
recording the file, for which the fsync system call has occurred, in a data area of the memory; and
implementing the ordered mode journaling by storing an fsync journal including metadata of the file, for which the fsync system call has occurred, in a journal area of the memory.

8. The ordered mode journaling method of claim 7,
wherein the fsync journal comprises fsync journal header blocks,
the implementing of the journaling by storing the fsync journal records inode information and name information of the file, for which the fsync system call has occurred, in the fsync journal header blocks.

9. The ordered mode journaling method of claim 7,
wherein the step of implementing the journaling stores the common journal and the fsync journal using an appending manner in the journal area of the memory.

10. A method for restoring a file system based on ordered mode journaling, comprising:
identifying a type of a journal finally stored in a journal area of a memory;
restoring the file system by using metadata of a common journal if the type of the journal is the common journal; and
restoring the file system by using metadata of an fsync journal if the type of the journal is an fsync journal.

11. The method of claim 10,
wherein the step of restoring of the file system by using the metadata of the fsync journal comprises correcting the metadata recorded in the memory by using the metadata recorded in the fsync journal.

* * * * *